Patented Jan. 23, 1945

2,368,074

UNITED STATES PATENT OFFICE 2,368,074

PROCESS FOR THE PRODUCTION OF RIBOFLAVIN BY BUTYL ALCOHOL PRODUCING BACTERIA

Milford T. Walton, Peoria, Ill., assignor to Commercial Solvents Corporation, Terre Haute, Ind., a corporation of Maryland No Drawing. Application October 24, 1940, Serial No. 362,568

5 Claims. (Cl. 195—42)

My invention relates to an improved process for the production of riboflavin together with butyl alcohol and other neutral solvents, by the fermentation of starch mashes.

The fermentation of carbohydrate mashes by means of butyl alcohol-producing bacteria, has for many years been a successful commercial process. One of the most important products of this fermentation constitutes riboflavin, otherwise known as flavin, lactoflavin, vitamin G, or vitamin $B_2$. This product may be recovered from the residual solids of the fermented mash, as disclosed in U. S. Pat. No. 2,202,161 of Carl S. Miner. It has recently been found that relatively high yields of riboflavin can be obtained by effecting the process in the absence of inhibiting amounts of iron, nickel, cobalt, copper, lead, and zinc. This improvement is disclosed in co-pending application, Ser. No. 362,567, now U. S. Patent No. 2,326,425 of C. F. Arzberger, and is especially applicable to the fermentation of corn mashes by means of bacteria of the type *Clostridium acetobutylicum* (Weizmann).

Corn has been almost universally employed as the source of carbohydrate in the commercial production of butyl alcohol, acetone, and ethyl alcohol by the fermentation of starch mashes, utilizing bacteria of the type *Clostridium acetobutylicum* (Weizmann). Corn is also a desirable raw material from the standpoint of riboflavin production, but it is shown in co-pending application, Ser. No. 362.569, of W. N. McCutchan, that rice, and especially unpolished rice, produces higher yields of riboflavin than can be obtained from corn. The use of rice as the carbohydrate material for this fermentation has certain disadvantages, however, especially the relatively high cost of rice, and the fact that the dried soluble solids from a fermented rice mash are hygroscopic and difficult to handle.

I have now found that unexpected advantages are to be obtained by using a mixture of corn and rice as the carbohydrate material for this fermentation. I have found that partial substitution of rice in a corn mash results in increased yields of riboflavin far greater than could be expected from a comparison of yields in all-corn and all-rice mashes. Even a very low proportion of rice in the mash is effective in increasing the riboflavin yield, and relatively high proportions of rice may be used without encountering difficulties with respect to hygroscopicity of the dried residual solids. I have also found that not only is the increase in riboflavin yield much greater than the proportional increase to be expected, but the yield from a corn-rice mash may even be considerably greater than that obtained from an all-rice mash. High yields of solvents are also obtainable from mashes prepared from corn-rice mixtures. Other advantages of the use of my improved mashes in this process may be seen from the following description.

My mashes may be prepared in accordance with standard practices for mashing and sterilizing used in the past for corn-mash fermentations by means of bacteria of the type *Clostridium acetobutylicum* (Weizmann). Preferably the mash is prepared solely from the grains and water, although other materials may be added if they do not interfere with the normal fermentation to produce riboflavin, together with butyl alcohol and other neutral solvents. The corn and rice may be mashed and cooked separately, but it is simpler and more economical to treat them together in a single, initial mash. The corn is preferably ground to a relatively fine meal, and either whole corn meal or degerminated meal may be used. The rice may likewise be ground, if desired, but I prefer to use unground rice. Polished rice may be used in my mashes, but I generally prefer to use unpolished rice. In the milling of rice, the husk is first removed from the whole grain, or "brown paddy," to yield brown rice. The germ and most of the bran are then removed from the brown rice, and the resulting grain is subjected to a polishing operation to obtain the white, polished rice used largely for human consumption. I prefer to use rice at any stage of processing prior to this final polishing operation. Brown rice, which is the common unpolished rice of commerce, is especially suitable for use in my mashes.

The concentration of grain in the mash may be varied within relatively wide limits, for example, from 2% to 8% (total dry weight of the cereal grains) based on the total weight of the mash. For maximum riboflavin production I prefer to employ mashes of 4%–6% concentration.

The proportion of rice in the mash may also vary within wide limits, for example, from 5% to 95% by weight, based on the total dry weight of the cereal grains. I generally prefer to employ a proportion of rice ranging from 10% to 50% of the total grain. Too low a proportion of rice may not secure a sufficient increase in riboflavin yield to warrant the expense of handling two separate grains; and too high a proportion of rice may result in a greater raw material expense than is warranted by the increase in riboflavin yield, and may produce dry residual solids tending to approach the hygroscopicity of the solids of an all-rice mash. I have generally found that, from an economic standpoint, a proportion of about 25% of rice is preferable. However, for any particular conditions encountered, preliminary experiments will indicate the optimum proportion of rice which is economically warranted.

For the fermentation of my mashes, any of the class of starch-fermenting butyl alcohol-producing bacteria may be employed, but I prefer to use bacteria of the type *Clostiridium acetobutylicum* (Weizmann). The fermentation conditions should, of course, be chosen to satisfy the known requirements of the particular species or strain of bacteria employed, and should be such as to promote the normal type of fermentation resulting in the production of riboflavin, together with butyl alcohol and other neutral solvents. The maintenance of aseptic conditions and optimum temperature during the fermentation, and other standard practices in butyl alcohol fermentation art, should, of course, be followed. In addition to these usual precautions, the grain for my mashes is preferably subjected to a thorough cleaning operation, and the amounts of iron, nickel, cobalt, copper, lead, and zinc in the fermentation system are maintained below inhibiting amounts as disclosed in Ser. No. 362,567, now U. S. Patent No. 2,326,425 of C. F. Arzberger referred to above. According to the procedure described in the aforesaid patent, the concentration of interfering metals or compounds thereof is kept at a minimum by a means of a combination of several steps. First, in preparing the grain prior to cooking, it is subjected to an air blowing operation and, if necessary or desirable, then subjected to a magnetic separating operation to insure removal of tramp iron. After the grain has thus been cleaned, it is ground in a stone buhr mill. The grain ground in this manner is then placed in a suitable cooker constructed of aluminum or various aluminum alloys and cooked in water which is substantially free of interfering metals. After the cooking period is completed, the mash is conducted to aluminum or aluminum alloy fermenters where it is fermented in a known manner. In general, it may be said that my invention is not limited to any particular operating procedure, but that any of the known procedures may be employed, if they do not prevent the normal course of the fermentation to produce riboflavin, together with butyl alcohol and other neutral solvents.

My invention may be further illustrated by the following specific examples:

EXAMPLE I

Various mashes were prepared from whole corn meal, from unground brown rice, and from corn-rice mixtures in the proportions shown in the table below. The mashes consisted solely of grain and water, with a grain concentration of 5% by weight, dry basis. The mashes were prepared, sterilized, and fermented in glass vessels, and the fermentation in each case was effected by means of an active culture of *Clostridium acetobutylicum* (Weizmann). In each case, at the conclusion of the fermentation the solvents (butyl alcohol, acetone, and ethyl alcohol) were recovered by distillation, the distillation residue was evaporated to dryness, and the riboflavin content of the dried residue was determined by microbiological assay. The results are shown in the table below.

*Table*

| Corn, per cent of total grain | Brown rice, per cent of total grain | Yield of solvents, per cent of original grain, dry basis | Yield of riboflavin, μg. per gram of original grain | Yield of riboflavin, μg. per gram of dry solids |
|---|---|---|---|---|
| 100 | 0 | 24.4 | 747 | 2,648 |
| 90 | 10 | 26.7 | 833 | 2,705 |
| 75 | 25 | 27.2 | 860 | 3,025 |
| 50 | 50 | 28.0 | 950 | 3,518 |
| 0 | 100 | 27.6 | 782 | 3,100 |

EXAMPLE II

The experiment of Example I was repeated, using a different sample of whole corn meal, and a different sample of brown rice. At the conclusion of the fermentation, in each case, one portion of the fermented mash was evaporated to dryness and another portion was filtered and the filtrate evaporated to dryness. Riboflavin yields and the riboflavin content of the dried total solids, and of the dried filtrate solids, were determined by microbiological assay. Results are shown in the table below:

*Table*

| Corn, per cent of total grain | Brown rice, per cent of total grain | Yield of riboflavin in total solids | | Yield of riboflavin in filtrate solids | |
|---|---|---|---|---|---|
| | | μg. per gram of original grain | μg. per gram of dry solids | μg. per gram of original grain | μg. per gram of dry solids |
| 100 | 0 | 650 | 2,216 | 682 | 3,324 |
| 75 | 25 | 800 | 2,400 | 765 | 3,453 |
| 50 | 50 | 718 | 2,703 | 725 | 3,886 |
| 25 | 75 | 707 | 2,760 | 667 | 3,756 |
| 0 | 100 | 672 | 2,682 | 612 | 3,626 |

EXAMPLE III

A corn mash (5% whole corn meal by weight), and mashes in which 25% and 50% of the corn meal were replaced by unground polished rice and by unground brown rice, were prepared, sterilized, and fermented in glass vessels. The fermentations were effected by means of an active culture of *Clostridium acetobutylicum* (Weizmann). In each case, at the conclusion of the fermentation, the yield of solvents was determined, the fermented mash was filtered, and the filtrate was evaporated to dryness. Solvent yields, riboflavin yields, and riboflavin content of the dried solids from the filtrates, are shown in the table below:

*Table*

| Corn, percent of total grain | Polished rice, per cent of total grain | Brown rice, per cent of total grain | Yield of solvents, percent of original grain, dry basis | Yield of riboflavin, μg. per gram of original grain | Yield of riboflavin μg. per gram of dry solids |
|---|---|---|---|---|---|
| 100 | | 0 | 25.1 | 505 | 2,500 |
| 75 | 25 | | 26.9 | 612 | 3,296 |
| 75 | | 25 | 27.0 | 668 | 3,716 |
| 50 | 50 | | 27.3 | 777 | 4,319 |
| 50 | | 50 | 29.3 | 766 | 4,672 |

The following example illustrates the effects of the substitution of relatively low proportions of rice in corn mashes:

EXAMPLE IV

The procedure of Example III was followed, utilizing the proportions of unground brown rice shown in the table below. Riboflavin yields and the riboflavin content of the dry solids obtained by evaporating to dryness the filtrates from the fermented mashes, are shown in this table.

Table

| Corn, per cent of total grain | Brown rice, per cent of total grain | Yield of riboflavin, μ g. per gram of original grain | Yield of riboflavin, μ g. per gram of dry solids |
|---|---|---|---|
| 100 | 0 | 448 | 2,635 |
| 95 | 5 | 563 | 2,935 |
| 90 | 10 | 550 | 2,865 |
| 85 | 15 | 563 | 3,065 |
| 80 | 20 | 762 | 3,965 |
| 75 | 25 | 797 | 4,335 |

It should be recognized that the specific yields of riboflavin in the above examples are merely illustrative, and that yields of an entirely different order may be obtained with other strains or species of bacteria, and under other operating conditions. I have obtained yields of riboflavin from corn-rice mashes both higher and lower than the specific illustrative yields given above. Very low yields may be encountered in the presence of the metal compounds referred to herein, or in the presence of other inhibitory materials. Also, numerous species and strains of butyl alcohol producing bacteria are known to produce low yields of riboflavin even under optimum fermentation conditions. The above examples, therefore, should be considered primarily from the standpoint of the relative, rather than the absolute, yields of riboflavin shown. It is this relative improvement which is accomplished by my new fermentation mashes, irrespective of the absolute yields of riboflavin which may be caused by other factors such as those discussed above.

It is also to be understood that the above examples are not to be construed as limiting the scope of my invention. Proportions of corn and rice other than those illustrated in the examples, may, of course, be used, and other materials previously used in butyl alcohol fermentation mashes may be employed in conjunction with my corn-rice mixtures, if desired. The mashing, sterilizing, and fermenting conditions may likewise be modified in numerous respects, in accordance with prior practices, so long as the modifications do not prevent the normal course of the fermentation to produce riboflavin, together with butyl alcohol and other neutral solvents. In general, it may be said that the use of any equivalents or modifications of procedure, which would naturally occur to one skilled in the art, is included in the scope of my invention.

My invention now having been described, what I claim is:

1. In a process in which a starch mash is fermented by means of bacteria of the type *Clostridium acetobutylicum* (Weizmann) to produce high yields of riboflavin, together with butyl alcohol, acetone, and ethyl alcohol, while maintaining the effective amounts of iron, nickel, cobalt, copper, lead, and zinc present in the fermentation system sufficiently low to prevent substantial inhibitory effects of said materials on riboflavin synthesis, the improvement which comprises effecting the fermentation in a mash comprising essentially an aqueous suspension of corn and rice, containing at least 5% of rice, by weight.

2. In a process in which the starch mash is fermented by means of bacteria of the type *Clostridium acetobutylicum* (Weizmann) to produce high yields of riboflavin, together with butyl alcohol, acetone, and ethyl alcohol, while maintaining the effective amounts of iron, nickel, cobalt, copper, lead, and zinc present in the fermentation system sufficiently low to prevent substantial inhibitory effects of said materials on riboflavin synthesis, the improvement which comprises effecting the fermentation in a mash comprising essentially an aqueous suspension of corn and brown rice, containing 10%–50% of brown rice, by weight.

3. In a process in which a starch mash is fermented by means of bacteria of the type *Clostridium acetobutylicum* (Weizmann) to produce high yields of riboflavin, together with butyl alcohol, acetone, and ethyl alcohol, while maintaining the effective amounts of iron, nickel, cobalt, copper, lead, and zinc present in the fermentation system sufficiently low to prevent substantial inhibitory effects of said materials on riboflavin synthesis, the improvement which comprises effecting the fermentation in a mash comprising essentially an aqueous suspension of approximately 5% by weight of a mixture of whole corn meal and brown rice, containing approximately 25% by weight of brown rice.

4. In a process in which a starch mash is fermented by means of bacteria of the type *Clostridium acetobutylicum* (Weizmann) to produce high yields of riboflavin together with butyl alcohol, acetone, and ethyl alcohol, the improvement which comprises effecting the fermentation in a mash comprising essentially an aqueous suspension of corn and rice, containing at least 5% of rice, by weight.

5. In a process in which a starch mash is fermented by means of bacteria of the type *Clostribium acetobutylicum* (Weizmann) to produce high yields of riboflavin together with butyl alcohol, acetone, and ethyl alcohol, the improvement which comprises effecting the fermentation in a mash comprising essentially an aqueous suspension of corn and brown rice, containing 10%–50% of brown rice, by weight.

MILFORD T. WALTON.